(12) United States Patent
Tempel et al.

(10) Patent No.: US 7,172,646 B2
(45) Date of Patent: *Feb. 6, 2007

(54) REACTIVE LIQUID BASED GAS STORAGE AND DELIVERY SYSTEMS

(75) Inventors: Daniel Joseph Tempel, Macungie, PA (US); Philip Bruce Henderson, Allentown, PA (US); Jeffrey Richard Brzozowski, Kunkletown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 658 days.

This patent is subject to a terminal disclaimer.

(21) Appl. No.: 10/413,787

(22) Filed: Apr. 15, 2003

(65) Prior Publication Data

US 2004/0206241 A1 Oct. 21, 2004

(51) Int. Cl.
*B01D 19/00* (2006.01)

(52) U.S. Cl. .............................. 95/241; 423/210; 222/3

(58) Field of Classification Search .................. 95/149, 95/232–235, 241; 96/155, 243; 423/210; 422/129; 206/0.6, 0.7; 222/3; 252/181.3
See application file for complete search history.

(56) References Cited

U.S. PATENT DOCUMENTS

| 5,473,904 A | 12/1995 | Guo et al. |
| 5,993,766 A | 11/1999 | Tom et al. |
| 6,660,063 B2 * | 12/2003 | Tom et al. ...................... 95/90 |
| 2005/0276733 A1 * | 12/2005 | Tempel et al. .............. 422/211 |
| 2006/0008392 A1 * | 1/2006 | Graham et al. ............. 422/168 |

FOREIGN PATENT DOCUMENTS

| EP | 0 740 104 | 10/1996 |
| WO | WO 99/27561 | 6/1999 |

* cited by examiner

*Primary Examiner*—Frank M. Lawrence
(74) *Attorney, Agent, or Firm*—Geoffrey L. Chase (57) ABSTRACT

This invention relates generally to an improvement in low pressure storage and dispensing systems for the selective storing of gases having Lewis acidity or basicity, and the subsequent dispensing of said gases at pressures, e.g., generally below 5 psig and typically below atmospheric pressure, by modest heating, pressure reduction or both. The improvement resides in storing the gases in a reversibly reacted state within a reactive liquid having opposing Lewis basicity or acidity.

22 Claims, 2 Drawing Sheets

REACTIVE LIQUID BASED GAS STORAGE AND DELIVERY SYSTEMS

BACKGROUND OF THE INVENTION

Many processes in the semiconductor industry require a reliable source of process gases for a wide variety of applications. Often these gases are stored in cylinders or vessels and then delivered to the process under controlled conditions from the cylinder. The semiconductor manufacturing industry, for example, uses a number of hazardous specialty gases such as phosphine ($PH_3$), arsine ($AsH_3$), and boron trifluoride ($BF_3$) for doping, etching, and thin-film deposition. These gases pose significant safety and environmental challenges due to their high toxicity and pyrophoricity (spontaneous flammability in air). In addition to the toxicity factor, many of these gases are compressed and liquefied for storage in cylinders under high pressure. Storage of toxic gases under high pressure in metal cylinders is often unacceptable because of the possibility of developing a leak or catastrophic rupture of the cylinder.

In order to mitigate some of these safety issues associated with high pressure cylinders, on-site electrochemical generation of such gases has been used. Because of difficulties in the on-site synthesis of the gases, a more recent technique of low pressure storage and delivery systems has been to adsorb these gases onto a solid support. These storage and delivery systems are not without their problems. They suffer from poor capacity and delivery limitations, poor thermal conductivity, and so forth.

The following patents and articles are illustrative of low pressure, low flow rate gas storage, and delivery systems.

U.S. Pat. No. 4,744,221 discloses the adsorption of $AsH_3$ onto a zeolite. When desired, at least a portion of the $AsH_3$ is released from the delivery system by heating the zeolite to a temperature of not greater than about 175° C. Because a substantial amount of $AsH_3$ in the container is bound to the zeolite, the effects of an unintended release due to rupture or failure are minimized relative to pressurized containers.

U.S. Pat. No. 5,518,528 discloses delivery systems based on physical sorbents for storing and delivering hydride, halide, and organometallic Group V gaseous compounds at sub-atmospheric pressures. Gas is desorbed by dispensing it to a process or apparatus operating at lower pressure.

U.S. Pat. No. 5,704,965 discloses sorbents for use in storage systems where the sorbents may be treated, reacted, or functionalized with chemical moieties to facilitate or enhance adsorption or desorption of fluids. Examples include the storage of hydride gases such as arsine on a carbon sorbent.

U.S. Pat. No. 5,993,766 discloses physical sorbents for sub-atmospheric storage and dispensing of fluids in which the sorbent can be chemically modified to affect its interaction with selected fluids. For example, a sorbent material may be functionalized with a Lewis basic amine group to enhance its sorbtive affinity for $B_2H_6$ (sorbed as $BH_3$).

U.S. Pat. No. 6,277,342 discloses a method for delivering Brønsted basic gases via reversibly protonating the gases using at least one polymer support bearing acid groups. The resulting salt formed from the acid/base reaction becomes sorbed to the polymer support.

BRIEF SUMMARY OF THE INVENTION

This invention relates generally to an improvement in low pressure storage and dispensing systems for the selective storing of gases having Lewis basicity or acidity, and the subsequent dispensing of said gases, generally at pressures of 5 psig and below, typically at subatmospheric pressures, e.g., generally below 760 Torr, by pressure differential, heating, or a combination of both. The improvement resides in storing the gases in a reversibly reacted state with a reactive liquid having Lewis acidity or basicity.

Several advantages for achieving safe storage, transportation, and delivery of gases having Lewis basicity or acidity can be achieved. These include:

an ability to maintain a reliable source of these gases wherein the gases are maintained near or below atmospheric pressure during shipping and storage;

an ability to store and deliver gases in essentially pure form;

an ability to manage the problems associated with the transfer of heat during gas loading and dispensing;

an ability to allow for mechanical agitation and pumping, thereby making operations such as compound transfer more efficient;

an ability to optimize the binding affinity for a given gas through choice of reactive component; and, an ability to obtain high gas (or working) capacities compared to the surface adsorption and chemisorption approaches associated with solid adsorbents.

DETAILED DESCRIPTION OF THE INVENTION

This invention relates to an improvement in a low-pressure storage and delivery system for gases having Lewis basicity or acidity, particularly hazardous specialty gases such as phosphine, arsine and boron trifluoride, which are utilized in the electronics industry. The improvement resides in storing the gases in a continuous liquid medium by effecting a reversible reaction between a gas having Lewis basicity with a reactive liquid having Lewis acidity or, alternatively, a gas having Lewis acidity with a reactive liquid having Lewis basicity.

The system for storage and dispensing of a gas comprises a storage and dispensing vessel constructed and arranged to hold a liquid-phase medium having a reactive affinity for the gas to be stored, and for selectively flowing such gas into and out of such vessel. A liquid-phase medium having a reactive affinity for the gas is disposed in the storage and dispensing vessel. A dispensing assembly is coupled in gas flow communication with the storage and dispensing vessel, and constructed and arranged for selective, on-demand dispensing of the gas having Lewis acidity or Lewis basicity, by thermal and/or pressure differential-mediated evolution from the reactive liquid-phase medium. The dispensing assembly can be constructed and arranged:

(i) to provide, exteriorly of said storage and dispensing vessel, a pressure below said interior pressure, to effect evolution of the gas from the reactive liquid-phase medium, and flow of gas from the vessel through the dispensing assembly; and/or (ii) to provide means for removal of heat of reaction of the gas with the reactive liquid and for heating the reactive liquid to effect evolution of the gas therefrom, so that the gas flows from the vessel into the dispensing assembly.

Thus, in one aspect, the invention relates to a system for the storage and delivery of a gas having Lewis basicity, comprising a storage and dispensing vessel containing a reactive liquid having Lewis acidity and having a reactive affinity for the gas having Lewis basicity. In another aspect, the invention relates to a system for the storage and delivery of a gas having Lewis acidity, comprising a storage and dispensing vessel containing a reactive liquid having Lewis basicity and having a reactive affinity for the gas having Lewis acidity.

A further feature of the invention is that the gas reactively stored within the reactive liquid is readily removable from the reactive liquid by pressure-mediated and/or thermally-mediated methods. By pressure-mediated evolution is meant evolution involving the establishment of pressure conditions, which typically range from $10^{-1}$ to $10^{-7}$ Torr at 25° C., to cause the gas to evolve from the reactive liquid. For example, such pressure conditions may involve the establishment of a pressure differential between the reactive liquid in the vessel, and the exterior environment of the vessel, which causes flow of the fluid from the vessel to the exterior environment (e.g., through a manifold, piping, conduit or other flow region or passage). The pressure conditions effecting gas evolution may involve the imposition on the reactive liquid of vacuum or suction conditions which effect extraction of the gas from the vessel.

By thermally-mediated evolution is meant heating of the reactive liquid to cause the evolution of the gas from the reactive liquid so that the gas can be withdrawn or discharged from the vessel. Typically, the temperature for thermal-mediated evolution ranges from 30° C. to 150° C. Because the complexing medium is a continuous liquid, as opposed to a porous solid medium as employed in the prior art processes, heat transfer is facilitated.

Figure 1:
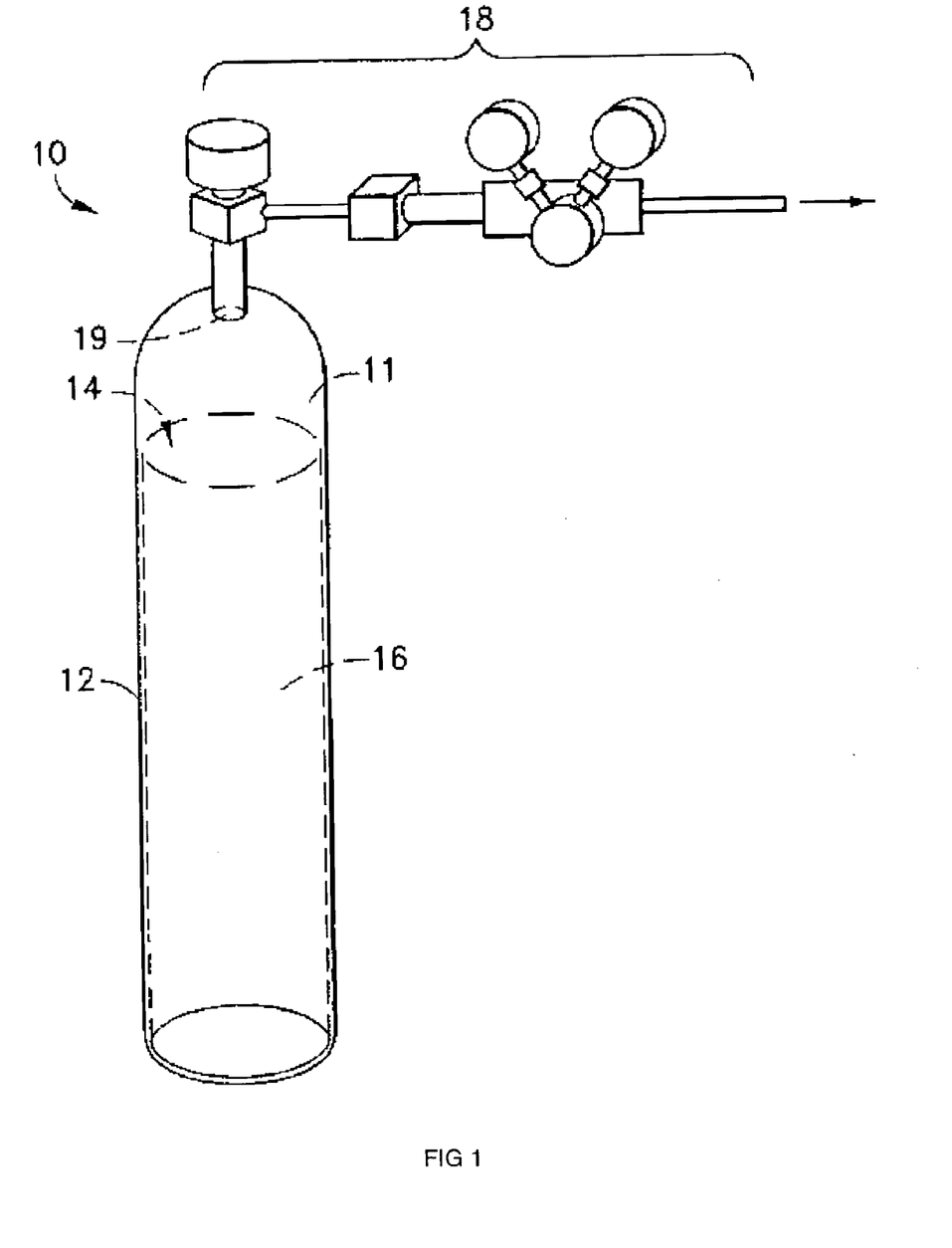
FIG. 1 is a schematic perspective representation of a storage and dispensing vessel with associated flow circuitry for the storage and dispensing of gases such as phosphine, arsine, and boron trifluoride.

To facilitate an understanding of the storage and delivery system in terms of the general description above, reference is made to FIG. 1. The storage and dispensing system 10 comprises storage and dispensing vessel 12 such as a conventional gas cylinder container of elongate character. In the interior volume 14 of such vessel is disposed a liquid 16 of a suitable reactivity with the gas to be stored. The vessel 12 is provided at its upper end with a conventional cylinder head gas dispensing assembly 18, which includes valves, regulators, etc., coupled with the main body of the cylinder 12 at the port 19. Port 19 allows gas flow from the reactive liquid retained in the cylinder into the dispensing assembly 18. Optionally, the vessel can be equipped with an on/off valve and the regulator provided at the site for delivery.

The storage and delivery vessel 12 may be provided with internal heating means (not shown) which serves to thermally assist in shifting the equilibrium such that the gas bonded to the reactive liquid is released. Often, the gas stored in the reactive liquid is at least partially, and most preferably fully, dispensed from the storage and dispensing vessel containing the gas by pressure-mediated evolution. Such pressure differential may be established by flow communication between the storage and dispensing vessel, on the one hand, and a vacuum or low pressure ion implantation chamber, on the other. The storage and delivery vessel 12 may also be provided with a means of agitation (not shown) which serves to enhance the rate of gas diffusion from the reactive liquid.

The storage and delivery vessel 12 may be used as the reactor itself in that a reactive liquid can be transferred into the vessel and the gas subsequently added under conditions for forming the reaction complex in situ within the vessel. The reactive complex comprised of the reactive liquid and gas can also be formed external to the storage and delivery system and transferred into the storage vessel 12.

The key to the process described herein is the use of a reactive, nonvolatile liquid for storage and delivery of the gas having opposing Lewis acidity or Lewis basicity to that of the gas. The selection of the reactive liquid for association with the gas, whether Lewis basic or Lewis acidic, is to provide for a working capacity within a pressure range from 20 to 760 Torr of at least 0.5 mole of gas per liter of liquid, preferably greater than 1 mole of gas per liter of liquid, (e.g. 34 grams of $PH_3$, 78 grams of $AsH_3$, 28 grams of $B_2H_6$, or 68 grams of $BF_3$ per liter of liquid), and allow for removal from the reactive liquid of at least 15%, preferably at least 50%, and most preferably at least 65% of the reacted gas within a working pressure range of from 20 to 760 Torr over a temperature range from subambient, e.g., 0° C., to 150° C.

A suitable reactive liquid has low volatility and preferably has a vapor pressure below about $10^{-2}$ Torr at 25° C. and, more preferably, below $10^{-4}$ Torr at 25° C. In this way, the gas to be evolved from the reactive liquid can be delivered in substantially pure form and without substantial contamination from the reactive liquid carrier. Liquids with a vapor pressure higher than $10^{-2}$ Torr may be used if contamination can be tolerated. If not, a scrubbing apparatus may be required to be installed between the liquid sorbent and process equipment. In this way, the reactive liquid can be scavenged to prevent it from contaminating the gas being delivered. Ionic liquids have low melting points (i.e. typically below room temperature) and typically decompose before vaporizing, usually at temperatures above 200° C., which make them well suited for this application.

Ionic liquids can act as a reactive liquid, either as a Lewis acid or Lewis base, for effecting reversible reaction with the gas to be stored. These reactive ionic liquids have a cation component and an anion component. The acidity or basicity of the reactive ionic liquids then is governed by the strength of the cation, the anion, or by the combination of the cation and anion. The most common ionic liquids comprise salts of alkylphosphonium, alkylammonium, N-alkylpyridinium or N,N'-dialkylimidazolium cations. Common cations contain $C_{1-18}$ alkyl groups, and include the ethyl, butyl and hexyl derivatives of N-alkyl-N'-methylimidazolium and N-alkylpyridinium. Other cations include pyridazinium, pyrimidinium, pyrazinium, pyrazolium, triazolium, thiazolium, and oxazolium.

Also known are "task-specific" ionic liquids bearing reactive functional groups on the cation. Such ionic liquids can be prepared using functionalized cations containing a Lewis base or Lewis acid functional group, and these ionic liquids can be used here. Task specific ionic liquids often are aminoalkyl, such as aminopropyl; ureidopropyl, and thio-ureido derivatives of the above cations. Specific examples of task-specific ionic liquids containing functionalized cations include salts of 1-alkyl-3-(3-aminopropyl)imidazolium, 1-alkyl-3-(3-ureidopropyl)imidazolium, 1-alkyl-3-(3-thio-ureidopropyl)imidazolium, 1-alkyl-4-(2-diphenylphosphanylethyl)pyridinium, 1-alkyl-3-(3-sulfopropyl)imidazolium, and trialkyl-(3-sulfopropyl)phosphonium.

A wide variety of anions can be matched with the cation component of such ionic liquids for achieving Lewis acidity. One type of anion is derived from a metal halide. The halide most often used is chloride although the other halides may also be used. Preferred metals for supplying the anion component, e.g. the metal halide, include copper, aluminum, iron, zinc, tin, antimony, titanium, niobium, tantalum, gallium, and indium. Examples of metal chloride anions are $CuCl_2^-$, $Cu_2Cl_3^-$, $AlCl_4^-$, $Al_2Cl_7^-$, $ZnCl_3^-$, $ZnCl_4^{2-}$, $Zn_2Cl_5^-$, $FeCl_3^-$, $FeCl_4^-$, $Fe_2Cl_7^-$, $TiCl_5^-$, $TiCl_6^{2-}$, $SnCl_5^-$, $SnCl_6^{2-}$, etc.

As is known in the synthesis of ionic liquids, the type of metal halide and the amount of the metal halide employed has an effect on the acidity of the ionic liquid. For example, when aluminum trichloride is added to a chloride precursor, the resulting anion may be in the form $AlCl_4^-$ or $Al_2Cl_7^-$. The two anions derived from aluminum trichloride have different acidity characteristics, and these differing acidity characteristics impact on the type of gases that can be reactively stored.

Room temperature ionic liquids can be formed by reacting a halide compound of the cation with an anion supplying reactant.

Examples of halide compounds from which Lewis acidic or Lewis basic ionic liquids can be prepared include:
1-Ethyl-3-methylimidazolium bromide;
1-Ethyl-3-methylimidazolium chloride;
1-Butyl-3-methylimidazolium bromide;
1-Butyl-3-methylimidazolium chloride;
1-Hexyl-3-methylimidazolium bromide;
1-Hexyl-3-methylimidazolium chloride;
1-Methyl-3-octylimidazolium bromide;
1-Methyl-3-octylimidazolium chloride;
Monomethylamine hydrochloride;
Trimethylamine hydrochloride;
Tetraethylammonium chloride;
Tetramethyl guanidine hydrochloride;
N-Methylpyridinium chloride;
N-Butyl-4-methylpyridinium bromide;
N-Butyl-4-methylpyridinium chloride;
Tetrabutylphosphonium chloride; and
Tetrabutylphosphonium bromide.

When the system is used for storing phosphine or arsine, a preferred reactive liquid is an ionic liquid and the anion component of the reactive liquid is a cuprate or aluminate and the cation component is derived from a dialkylimidazolium salt.

Gases having Lewis basicity to be stored and delivered from Lewis acidic reactive liquids, e.g., ionic liquids, may comprise one or more of phosphine, arsine, stibine, ammonia, hydrogen sulfide, hydrogen selenide, hydrogen telluride, isotopically-enriched analogs, basic organic or organometallic compounds, etc.

With reference to Lewis basic ionic liquids, which are useful for chemically complexing Lewis acidic gases, the anion or the cation component or both of such ionic liquids can be Lewis basic. In some cases, both the anion and cation are Lewis basic. Examples of Lewis basic anions include carboxylates, fluorinated carboxylates, sulfonates, fluorinated sulfonates, imides, borates, chloride, etc. Common anion forms include $BF_4^-$, $PF_6^-$, $AsF_6^-$, $SbF_6^-$, $CH_3COO^-$, $CF_3COO^-$, $CF_3SO_3^-$, $p$-$CH_3$—$CH_6H_4SO_3^-$, $(CF_3SO_2)_2N^-$, $(NC)_2N^-$, $(CF_3SO_2)_3C^-$, chloride, and $F(HF)_n^-$. Other anions include organometallic compounds such as alkylaluminates, alkyl- or arylborates, as well as transition metal species. Preferred anions include $BF_4^-$, $p$-$CH_3$—$C_6H_4SO_3^-$, $CF_3SO_3^-$, $(CF_3SO_2)_2N^-$, $(NC)_2N^-(CF_3SO_2)_3C^-$, $CH_3COO^-$ and $CF_3COO^-$.

Ionic liquids comprising cations that contain Lewis basic groups may also be used in reference to storing gases having Lewis acidity. Examples of Lewis basic cations include N,N'-dialkyimidazolium and other rings with multiple heteroatoms. A Lewis basic group may also be part of a substituent on either the anion or cation. Potentially useful Lewis basic substituent groups include amine, phosphine, ether, carbonyl, nitrile, thioether, alcohol, thiol, etc.

Gases having Lewis acidity to be stored in and delivered from Lewis basic reactive liquids, e.g., ionic liquids, may comprise one or more of diborane, boron trifluoride, boron trichloride, $SiF_4$, germane, hydrogen cyanide, HF, HCl, HI, HBr, $GeF_4$, isotopically-enriched analogs, acidic organic or organometallic compounds, etc.

Nonvolatile covalent liquids containing Lewis acidic or Lewis basic functional groups are also useful as reactive liquids for chemically complexing gases. Such liquids may be discrete organic or organometallic compounds, oligomers, low molecular weight polymers, branched amorphous polymers, natural and synthetic oils, etc.

Examples of liquids bearing Lewis acid functional groups include substituted boranes, borates, aluminums, or alumoxanes; protic acids such as carboxylic and sulfonic acids, and complexes of metals such as titanium, nickel, copper, etc.

Examples of liquids bearing Lewis basic functional groups include ethers, amines, phosphines, ketones, aldehydes, nitrites, thioethers, alcohols, thiols, amides, esters, ureas, carbamates, etc. Specific examples of reactive covalent liquids include tributylborane, tributyl borate, triethylaluminum, methanesulfonic acid, trifluoromethanesulfonic acid, titanium tetrachloride, tetraethyleneglycol dimethylether, trialkylphosphine, trialkylphosphine oxide, polytetramethyleneglycol, polyester, polycaprolactone, poly(olefin-alt-carbon monoxide), oligomers, polymers or copolymers of acrylates, methacrylates, or acrylonitrile, etc. Often, though, these liquids suffer from excessive volatility at elevated temperatures and are not suited for thermal-mediated evolution. However, they may be suited for pressure-mediated evolution.

To provide an understanding of the concepts disclosed herein the following are relevant definitions to the process:

DEFINITIONS

Total Capacity (or Capacity): Moles of gas that will react with one liter of reactive liquid at a given temperature and pressure.

Working Capacity ($C_w$): Moles of gas per liter of reactive liquid which is initially stored and is subsequently removable from the liquid during the dispensing operation, specified for a given temperature and pressure range, typically at 20 to 50° C. over the pressure range 20 to 760 Torr.

$C_w$=(moles of reacted gas—moles of gas remaining after delivery)/(liters of reactive liquid)

Percent Reversibility: Percentage of gas initially reacted with the liquid which is subsequently removable by pressure differential, specified for a given temperature and pressure range, typically at 20 to 50° C. over the pressure range 20 to 760 Torr.

% Reversibility=[(moles of reacted gas—moles of gas remaining after delivery)/(moles of initially reacted gas)] *100.

It has been found that good Lewis acid/basic and Lewis basic/acidic systems can be established from the Gibbs free energy of reaction ($\Delta G_{rxn}$) for a given system. In a storage and delivery system based upon a reactive liquid and a gas having Lewis acidity or basicity, a $\Delta G_{rxn}$ range exists for operable temperature and pressure and is from −1 to about −6 kcal/mole. There also exists an optimum $\Delta G_{rxn}$ for a given temperature and pressure range, which corresponds to a maximum working capacity for the liquid. In reference to the gas $PH_3$, if the magnitude of $\Delta G_{rxn}$ (and thus, $K_{eq}$) is too small, the reactive liquid will have insufficient capacity for PH$_3$. This insufficient capacity may be compensated for by selecting a reactive liquid with a higher total capacity (i.e. higher concentration of PH$_3$ reactive groups). If the magnitude of $\Delta G_{rxn}$ (and thus, $K_{eq}$) is too large, an insufficient amount of PH$_3$ will be removable at the desired delivery temperature. For the reaction of PH$_3$ with a Lewis acid, A, at 25° C. and in the pressure range 20 to 760 Torr, the optimum value range for $\Delta G_{rxn}$ is about from −2.5 to −3.5 kcal/mol. For all systems in solution involving the reaction of a single equivalent of gas with a single equivalent of Lewis acid/base group, the optimum $\Delta G_{rxn}$ will be about −3 kcal/mol at 25° C. and between 20 to 760 Torr. The situation is more complex for other systems, e.g., if the gas and liquid react to give a solid complex, or if more than one equivalent of a gas reacts with a single equivalent of a Lewis acid/base group.

One of the difficulties in the development of a suitable storage and delivery system is the matching of a suitable reactive liquid with a suitable gas through prediction of the $\Delta G_{rxn}$. To minimize experimentation and project the viability of possible systems, quantum mechanical methods can be used to elucidate molecular structures. Density Functional Theory (DFT) is a popular ab initio method that can be used to determine a theoretical value for the change in electronic energy for a given reaction ($\Delta E_{rxn}$=sum of $E_{products}$−sum of $E_{reactants}$). The following is a discussion for this determination. The calculations are assumed to have an error of approximately ±3 kcal/mol.

The reaction of one equivalent of PH$_3$ gas with one equivalent of a Lewis acid acceptor (A) in the liquid phase to give a reaction product in the liquid phase is represented by the equations:

(Equation 1)

The equilibrium constant for this reaction, $K_{eq}$, is described by equation 1. $K_{eq}$ is dependent upon the change in Gibbs free energy for the reaction, $\Delta G_{rxn}$, which is a measure of the binding affinity between PH$_3$ and A. The relationships between $\Delta G$, K, and temperature (in Kelvin) are given in equations 2 and 3.

$$\Delta G = \Delta H - T\Delta S \quad \text{(Equation 2)}$$

$$\Delta G = -RT\ln K \quad \text{(Equation 3)}$$

The value $\Delta E_{rxn}$ can be used as an approximate value for the change in enthalpy ($\Delta H$, see equation 2). Also, if it is assumed that the reaction entropy ($\Delta S$) is about the same for similar reactions, e.g., reversible reactions under the same temperature and pressure conditions, the values calculated for $\Delta E_{rxn}$ can be used to compare against $\Delta G_{rxn}$ for those reactions on a relative basis, i.e., $\Delta G_{rxn}$ is approximately proportional to $\Delta E_{rxn}$. Thus, the values calculated for $\Delta E_{rxn}$ can be used to help predict reactive liquids, including ionic liquids having the appropriate reactivity for a given gas.

The following examples are intended to illustrate various embodiments of the invention and are not intended to restrict the scope thereof.

EXAMPLES

General Procedure

The following is a general procedure for establishing the effectiveness of reactive liquids for storing and delivering gases in the examples. PH$_3$ and BF$_3$ have been used as the descriptive gases for chemical complexation.

In a glove box, a 25 mL or 50 mL stainless steel reactor was charged with a known quantity of a liquid. The reactor was sealed, brought out of the glove box, and connected to an apparatus comprising a pressurized cylinder of pure PH$_3$ or BF$_3$, a stainless steel ballast, and a vacuum pump vented to a vessel containing a PH$_3$ or BF$_3$ scavenging material. The gas regulator was closed and the experimental apparatus was evacuated up to the regulator. Helium pycnometry was used to measure ballast, piping and reactor headspace volumes for subsequent calculations. The apparatus was again evacuated and closed off to vacuum. The following steps were used to introduce PH$_3$ or BF$_3$ to the reactor in increments: 1) the reactor was isolated by closing a valve leading to the ballast, 2) PH$_3$ or BF$_3$ was added to the ballast (ca. 800 Torr) via a mass flow controller, 3) the reactor valve was opened and the gas pressure was allowed to equilibrate while the reactor contents were stirred. These steps were repeated until the desired equilibrium vapor pressure was obtained. The quantity of PH$_3$ or BF$_3$ added in each increment was measured by pressure and volume difference according to the ideal gas law. The amount of reacted PH$_3$ or BF$_3$ was determined by subtracting tubing and reactor headspace volumes.

Example 1

BMIM$^+$Al$_2$Cl$_7^-$, Lewis Acidic Ionic Liquid for PH$_3$

Molecular modeling was used to calculate a binding energy, $\Delta E_{rxn}$, for this Lewis acidic ionic liquid with PH$_3$. The ionic liquid was modeled as an ion-pair, using 1,3-dimethylimidazolium as the cation, Al$_2$Cl$_7^-$ as the anion, and it was assumed that one equivalent of PH$_3$ reacted per equivalent of Al$_2$Cl$_7^-$ anion (concentration of Al$_2$Cl$_7^-$=3.2 mol/L). Structures were determined based on minimum energy geometry optimization using Density Functional Theory (DFT) at the BP level with a double numerical (DN**) basis set. This Lewis acidic ionic liquid was calculated to have a $\Delta E_{rxn}$ of 0.71 kcal/mol, which suggests that the reaction is slightly unfavorable, although within the general limitations of error. To clarify the results of modeling, the following reaction was run.

In a glove box, 9.07 g of AlCl$_3$ (2 equivalents) was slowly added to 5.94 g (1 equivalent) of 1-butyl-3-methylimidazolium chloride (BMIM$^+$Cl). (It is assumed the anion Al$_2$Cl$_7^-$ is formed from the reaction stoichiometry 2 equivalents AlCl$_3$ to 1 equivalent BMIM$^+$Cl$^-$) A 25 mL reactor was charged with 4.61 g of BMIM$^+$Al$_2$Cl$_7^-$ (density=1.2 g/mL) and the general procedure for measuring PH$_3$ reaction was followed. The ionic liquid reacted with 6.9 mmol of PH$_3$ at room temperature and 776 Torr, corresponding to 1.8 mol PH$_3$/L of ionic liquid.

The results show % reversibility=89%, working capacity=1.6 mol/L (room temperature, 20–760 Torr). The experimental $\Delta G_{rxn}$ is approximately −1.9 kcal/mol at 25° C.

These results show that the ionic liquid BMIM$^+$Al$_2$Cl$_7^-$ is effective as a reactive liquid for PH$_3$ and suitable for use in a storage and delivery system as shown in the figure and that the $\Delta E_{rxn}$ provides excellent guidance in the selection of a reactive system.

Delivery of the complex formed to storage and delivery system an be effected by pumping the complex to the vessel.

Example 2

BMIM$^+$CuCl$_2^-$, Lewis Acidic Ionic Liquid For PH$_3$

In a glove box, 3.10 g of CuCl was slowly added to a flask charged with 5.46 g of BMIM$^+$Cl$^-$ (1:1 stoichiometry). (It is assumed the anion CuCl$_2^-$ is formed from the reaction stoichiometry 1 equivalent CuCl to 1 equivalent BMIM$^+$Cl$^-$). The mixture was stirred overnight and stored. A glass insert was charged with 7.71 g of the ionic liquid (density=1.4 g/mL) and placed into a 50 mL reactor, and the general procedure for measuring PH$_3$ reaction was followed. The Lewis acidic ionic liquid reacted with 7.6 mmol of PH$_3$ at room temperature and 674 Torr, corresponding to 1.4 mol PH$_3$/L of ionic liquid. Equilibrium data points were not obtained and % reversibility and working capacity were not determined. But, this reactive liquid is expected to have a high % reversibility and, thus, a sufficient working capacity for a storage and delivery system.

Example 3

BMIM$^+$Cu$_2$Cl$_3^-$, Lewis Acidic Ionic Liquid For PH$_3$

Molecular modeling was used to approximate the effectiveness of BMIM$^+$Cu$_2$Cl$_3^-$ as a reactive liquid. The ionic liquid was modeled as an ion-pair, using 1,3-dimethylimidazolium as the cation, Cu$_2$Cl$_3^-$ as the anion, and it was assumed that one equivalent of PH$_3$ reacted with each equivalent of copper (concentration of Cu reactive groups=9.7 mol/L). Structures were determined based on minimum energy geometry optimization using Density Functional Theory (DFT) at the BP level with a double numerical (DN**) basis set. This Lewis acidic ionic liquid was calculated to have an average $\Delta E_{rxn}$ of −5.5 kcal/mol for its reaction with PH$_3$. The results indicate that this ionic liquid should bind PH$_3$ more strongly than BMIM$^+$Al$_2$Cl$_7^-$ of Example 1. Since $\Delta G_{rxn}$ is smaller in magnitude than $\Delta E_{rxn}$ and the optimum $\Delta G_{rxn}$ for the pressure range 20 to 760 Torr at room temperature is ca. −3 kcal/mol, the result suggests that the binding properties of BMIM$^+$Cu$_2$Cl$_3^-$ may be well suited for reversibly reacting with PH$_3$ (i.e., high working capacity and high % reversibility).

In a glove box, 11.6 g of CuCl was slowly added to a round bottom flask charged with 10.2 g of BMIM$^+$Cl$^-$ (2:1 stoichiometry). (It is assumed the anion Cu$_2$Cl$_3^-$ formed from the reaction stoichiometry 2 equivalents CuCl to 1 equivalent BMIM$^+$Cl$^-$). The mixture was stirred overnight. A glass insert was charged with 12.02 g of the ionic liquid (density=1.8 g/mL) and placed into a 50 mL reactor, and the general procedure for measuring PH$_3$ reaction was followed. The ionic liquid reacted with 51 mmol of PH$_3$ at room temperature and 736 Torr, corresponding to 7.6 mol PH$_3$/L of ionic liquid.

The results show % reversibility=84%, working capacity=6.4 mol/L (room temperature, 20–736 Torr). The experimental $\Delta G_{rxn}$ is approximately −2.6 kcal/mol at 22° C.

This reactive liquid outperformed the aluminate-based ionic liquid in Example 1 because it has a higher reactive group concentration (theoretical capacity of 9.7 vs. 3.2 mol/L), and its binding affinity for PH$_3$ as calculated by $\Delta E_{rxn}$ and measured by $\Delta G_{rxn}$ is better matched compared toBMIM$^+$Al$_2$Cl$_7^-$.

Example 4

BMIM$^+$BF$_4^-$, Lewis Base Ionic Liquid for PH$_3$

A 50 mL reactor was charged with 3.99 g of BMIM$^+$BF$_4^-$ and the general procedure for measuring PH$_3$ reaction was followed. The ionic liquid is slightly Lewis basic and it does not react with Lewis basic PH$_3$, demonstrating that a Lewis acidic species as described in Examples 1 to 3 is required for reaction with PH$_3$. The $\Delta G_{rxn}$ reaction is $\geq 0$.

Example 5

BMIM$^+$AlCl$_4^-$, Acid/Base Neutral Ionic Liquid for PH$_3$

A 50 mL reactor was charged with 9.81 g of BMIM$^+$AlCl$_4^-$ formed by adding AlCl$_3$ to BMIM$^+$Cl (1:1 stoichiometry) and the general procedure for measuring PH$_3$ reaction was followed. (It is assumed the anion AlCl$_4^-$ is formed from the reaction stoichiometry 1 equivalent AlCl$_3$ to 1 equivalent BMIM$^+$Cl$^-$). The ionic liquid reacted with 0.44 mmol of PH$_3$, corresponding to about 0.06 mol PH$_3$/L of ionic liquid. The AlCl$_4^-$ anion is not Lewis acidic. It is believed that the small amount of PH$_3$ reaction that was observed was likely due to the presence of a small concentration of Lewis acidic Al$_2$Cl$_7^-$. This example further demonstrates that a Lewis acidic species is required for reaction with PH$_3$. The $\Delta G_{rxn}$ reaction is $\geq 0$.

Example 6

Methanesulfonic Acid, Liquid Brønsted Acid for PH$_3$

A 50 mL reactor was charged with 8.81 g of methanesulfonic acid (density=1.35 g/mL) and the general procedure for measuring PH$_3$ reaction was followed. The acid reacted with 5.6 mmol of PH$_3$, corresponding to 0.86 mol PH$_3$/L of liquid.

The results show % reversibility=75%, working capacity=0.66 mol/L (room temperature, 20–514 Torr). The binding affinity between PH$_3$ and methanesulfonic acid is weak, so the total and working capacities are modest as compared to the reaction systems of Example 1–3 and the % reversibility is high. The system still meets the necessary criteria for a storage and delivery system. The delivered gas, because of the vapor pressure of methanesulfonic acid (~1 Torr at 25° C.), is contaminated with the acid and would require scrubbing prior to use.

Example 7

Triflic Acid, Liquid Brønsted Acid for PH$_3$

A 50 mL reactor was charged with 4.68 g of triflic acid (density=1.70 g/mL) and the general procedure for measuring PH$_3$ reaction was followed. The acid reacted with 14.7 mmol of PH$_3$, corresponding to 5.3 mol PH$_3$/L of liquid.

The results show % reversibility=0%, working capacity=0 mol/L (room temperature, 20–721 Torr). The binding affinity between PH$_3$ and triflic acid is too strong, so the reaction is irreversible at room temperature in the pressure range required. This liquid is too volatile for thermal-mediated evolution. It may be suited for a Lewis base gas having less affinity for the reactive liquid. The delivered gas, because of the high vapor pressure of triflic acid (8 Torr at 25° C.), would be contaminated with the acid and would require scrubbing prior to use.

Example 8

TiCl$_4$, Volatile Liquid Reactive Compound For PH$_3$

A 50 mL reactor was charged with 12.56 g of TiCl$_4$ (liquid, density=1.73 g/mol), the reactor was cooled to ca. 7° C. in and ice bath, and the general procedure for measuring PH$_3$ reaction was followed. The ionic liquid reacted with 100.3 mmol of PH$_3$, corresponding to 13.8 mol PH$_3$/L of TiCl$_4$ at an equilibrium vapor pressure of 428 Torr and a temperature of 12° C.

The results show % reversibility=41%, working capacity=5.6 mol/L (12° C., 44–428 Torr). The delivered gas, because of the high vapor pressure of the TiCl$_4$, is contaminated with the volatile titanium complexes and would require scrubbing prior to use.

Comparative Example 9

Comparison of PH$_3$ Isotherms for Zeolite 5 Å and Reactions of Lewis Acids with PH$_3$ A series of reaction isotherms for examples 1, 3, 6, 7, and 8 were acquired for comparison to a reported isotherm for PH$_3$ adsorption onto zeolite 5 Å. The isotherms are shown in FIG. 2.

Figure 2:
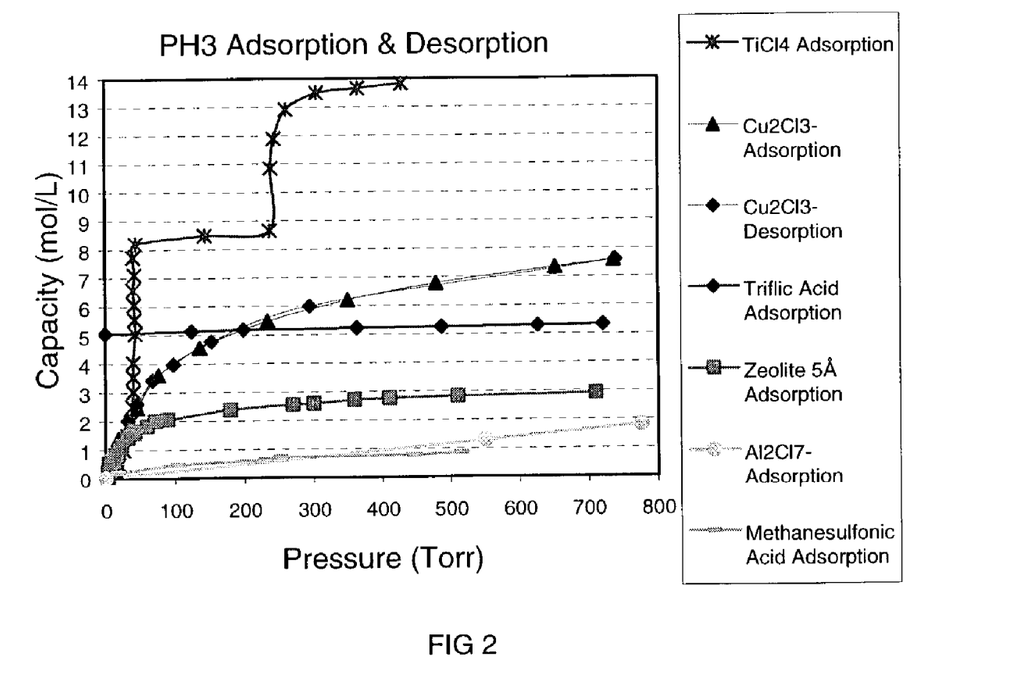
FIG. 2 is a graph of working capacity for phosphine for a number of reactive liquids.

In FIG. 2, it is observed that a significant portion of the total PH$_3$ adsorbed on zeolite 5 Å cannot be used under normal dispensing conditions because PH$_3$ is too strongly adsorbed. The adsorption isotherm for zeolite 5 Å indicates a working capacity of 1.9 mol/L with 66% reversibility between 20 and 710 Torr. Approximately ⅓ of the total PH$_3$ remains adsorbed at a pressure below 20 Torr.

Regarding BMIM$^+$Al$_2$Cl$_7^-$, it has a lower total capacity and working capacity (1.6 mol/L between 20 and 760 Torr) than zeolite 5 Å, but 89% of the PH$_3$ is reversibly bound down to 20 Torr.

The reaction isotherms obtained for BMIM$^+$Cu$_2$Cl$_3^-$ show that this ionic liquid has a significantly higher total capacity as well as working capacity (6.4 mol/L between 20 and 736 Torr) than zeolite 5 Å. The amount of PH$_3$ that is reversibly bound is also significantly higher (about 84% for BMIM$^+$Cu$_2$Cl$_3^-$ vs. 66% for zeolite 5 Å in the same pressure range).

FIG. 2 shows methanesulfonic acid has a low capacity (0.9 mol/L at 515 Torr) because it does not react strongly with PH$_3$; however, almost all of the PH$_3$ is reversibly reacted.

Triflic acid has a relatively high capacity (5.3 mol/L at 721 Torr), but essentially none of the reacted PH$_3$ is removable because the reaction (binding affinity) is too strong.

TiCl$_4$ reacts with more than a single equivalent of PH$_3$ and gives a multi-step isotherm. Although TiCl$_4$ provides a high working capacity (more than 5 mol/L between 44 and 428 Torr), the gas contains impurities as a result of the volatility of the titanium species.

Example 10

BMIM$^+$BF$_4^-$, Lewis Basic Ionic Liquid for BF$_3$

Molecular modeling was used to approximate the effectiveness of BMIM$^+$BF$_4^-$ as a reactive liquid for the chemical complexation of BF$_3$. The ionic liquid was modeled as an ion-pair, using 1,3-dimethylimidazolium as the cation, and it was assumed that one equivalent of BF$_3$ reacted with the anion from each equivalent of BMIM$^+$BF$_4^-$ (concentration of BF$_4^-$ reactive groups=5.4 mol/L). Structures were determined based on minimum energy geometry optimization using Density Functional Theory (DFT) at the BP level with a double numerical (DN**) basis set. This Lewis basic ionic liquid was calculated to have a $\Delta E_{rxn}$ of $-5.5$ kcal/mol for its reaction with BF$_3$.

The modeling results indicate that the binding affinity of this ionic liquid for BF$_3$ should be similar to the binding affinity between BMIM$^+$Cu$_2$Cl$_3^-$ and PH$_3$ in Example 3 where $\Delta E_{rxn}$ also is calculated to be $-5.5$ kcal/mol. Since the reversible reaction between the Lewis acidic BMIM$^+$Cu$_2$Cl$_3^-$ and Lewis basic PH$_3$ provides a near optimum working capacity, the result suggests that the binding properties of the Lewis basic BMIM$^+$BF$_4^-$ may be well suited for reversibly reacting with Lewis acidic BF$_3$ (i.e. high working capacity and high % reversibility).

In a glove box, a 25 mL stainless steel reactor was charged with 8.82 g of BMIM$^+$BF$_4^-$ purchased from Fluka (density=1.2 g/mL), and the general procedure for measuring BF$_3$ reaction was followed. The ionic liquid reacted with 38.4 mmol of BF$_3$ at room temperature and 724 Torr, corresponding to 5.2 mol BF$_3$/L of ionic liquid.

The results show % reversibility=70%, working capacity=3.6 mol/L (room temperature, 20–724 Torr). The experimental $\Delta G_{rxn}$ is $-3.4$ kcal/mol at 22° C. As predicted by molecular modeling, the reaction between BMIM$^+$BF$_4^-$ and BF$_3$ behaved similarly to the reaction between BMIM$^+$Cu$_2$Cl$_3^-$ and PH$_3$.

Example 11

Tetraglyme, Lewis Basic Liquid for BF$_3$

Molecular modeling was used to approximate the effectiveness of tetraethyleneglycol dimethylether (tetraglyme) as a reactive liquid. Calculations were carried out using dimethylether and diethylether to model the liquid, and it was assumed that one equivalent of BF$_3$ reacted with the ether oxygen in both cases. Structures were determined based on minimum energy geometry optimization using Density Functional Theory (DFT) at the BP level with a double numerical (DN**) basis set. Dimethylether was calculated to have a $\Delta E_{rxn}$ of $-9.1$ kcal/mol for its reaction with BF$_3$ and diethylether was calculated to have a $\Delta E_{rxn}$ of $-6.8$ kcal/mol for its reaction with BF$_3$.

The modeling results indicate that the binding affinity of tetraglyme for BF$_3$ may be too strong to be useful at ambient temperature. To confirm the results of modeling, the following reaction was run.

In a glove box, a 25 mL stainless steel reactor was charged with 8.42 g of tetraethyleneglycol dimethyl ether (tetraglyme) purchased from Acros (density=1.0 g/mL), and the general procedure for measuring BF$_3$ reaction was followed. The reaction was highly exothermic and reaction was rapid. The liquid reacted with 103.4 mmol of BF$_3$ at room temperature and 765 Torr, corresponding to 12.3 mol BF$_3$/L of liquid.

As predicted by molecular modeling, tetraglyme reacts strongly with BF$_3$ at room temperature. Essentially none of the chemically complexed BF$_3$ could be removed under vacuum at room temperature. Elevated temperatures may by useful for evolving the complexed BF$_3$, but if the delivered gas is contaminated with tetraglyme, the gas may require scrubbing. For applications requiring ambient temperature, the reactive liquid may be better suited for Lewis acids that are weaker than $BF_3$.

In summary, the results show that reactive liquids having Lewis acidity or basicity can be used for storing gases having opposing Lewis basicity or acidity and delivering such gases in substantially pure form at operating pressures from 20 to 760 Torr over a temperature range from 0 to 150° C.

The present invention has been set forth with regard to several preferred embodiments, but the full scope of the present invention should be ascertained from the claims which follow.

The invention claimed is:

1. In a process for effecting storage of a gas, within a storage and delivery system comprised of, i) a vessel containing a medium capable of storing a gas, and ii) a regulator for delivery of said gas stored in said medium from said vessel, the improvement selected from the group consisting of:
   storing a gas having Lewis basicity in a reversibly reacted state within a medium comprised of a reactive liquid having Lewis acidity; and,
   storing a gas having Lewis acidity in a reversibly reacted state within a medium comprised of a reactive liquid having Lewis basicity.

2. The process of claim 1 wherein the reactive liquid for association with the gas, having Lewis basicity or Lewis acidity, is sufficient to provide for a working capacity within a pressure range from 20 to 760 Torr of at least 0.5 mole of gas per liter of liquid and provide for evolution from the reactive liquid of at least 15% of the complexed gas at the operative temperature ranging from 0 to 150CC.

3. The process of claim 2 wherein at least 50% of the stored gas is removable within a working pressure range of from 20 to 760 Torr at a temperature from 20 to 50° C.

4. The process of claim 3 wherein the gas is Lewis basic and the reactive liquid is an ionic liquid having Lewis acidity.

5. The process of claim 4 wherein the Lewis basic gas is selected from the group consisting of phosphine, arsine, stibine, ammonia, hydrogen sulfide, hydrogen selenide, hydrogen telluride, and isotopically-enriched analogs.

6. The process of claim 5 wherein the ionic liquid having Lewis acidity is comprised of a salt of alkylphosphonium, alkylammonium, N-alkylpyridinium or N, N'-dialkylimidazolium cation.

7. The process of claim 6 wherein the anion component of such ionic liquids having Lewis acidity is derived from a metal halide selected from the group consisting of copper, aluminum, iron, zinc, tin, antimony, titanium, niobium, tantalum, gallium, and indium halide.

8. The process of claim 7 wherein the anion component is a metal chloride salt and the metal for supplying the anion component is selected from the group consisting of $CuCl_2^-$, $Cu_2Cl_3^-$, $AlCl_4^-$, $Al_2Cl_7^-$, $ZnCl_3^-$, $ZnCl_4^{2-}$, $Zn_2Cl_5^-$, $FeCl_3^-$, $FeCl_4^-$, $Fe_2Cl_7^-$, $TiCl_5^-$, $TiCl_6^{2-}$, $SnCl_5^-$, and $SnCl_6^{2-}$.

9. The process of claim 8 wherein the vapor pressure of said reactive liquid, having Lewis acidity is less than $10^{-4}$ Torr at 25° C.

10. The process of claim 9 wherein the gas having Lewis basicity is selected from the group consisting of phosphine and arsine.

11. The process of claim 5 wherein the ionic liquid is a cuprate or aluminate salt of alkyiphosphonium, alkylammonium, N-alkylpyridinium and N,N'-dialkylimidazolium cations.

12. In a process for effecting storage of a gas, in a storage and delivery system comprised of, i) a vessel containing a medium capable of storing a gas, and ii) a regulator for delivery of said gas stored in said medium from said vessel, the improvement which comprises:
   storing a gas having Lewis basicity in a reversibly reacted state within a medium comprised of a reactive liquid having Lewis acidity; where said gas is selected from the group consisting of arsine and phosphine and said liquid is an ionic liquid having a dialkyl-imidazolium cation and a chlorocuprate or chloroaluminate anion.

13. The process of claim 12 wherein the dialkylimidazolium cation is 1-butyl-3-methylimidazolium and said anion is selected from the group consisting of $Al_2Cl_7^-$, $CuCl_2^-$ and $Cu_2Cl_3^-$.

14. In a process for effecting storage of a gas, in a storage and delivery system comprised of, i) a vessel containing a medium capable of storing a gas, and ii) a regulator for delivery of said gas stored in said medium from said vessel, the improvement which comprises:
   storing a gas having Lewis acidity selected from the group consisting of diborane, boron trifluoride, boron trichloride, $SiF_4$, germane, hydrogen cyanide, HF, HCl, HI, HBr, $GeF_4$, isotopically-enriched analogs, acidic organic, organometallic compounds and mixtures thereof, in a reversibly reacted state within a medium comprised of a reactive ionic liquid having Lewis basicity employing an anion selected from the group consisting of $BF_4^-$, $p\text{-}CH_3\text{—}C_6H_4SO_3^-$, $CF_3SO_3^-$, $(CF_3SO_2)_2N^-$, $(NC)_2N^-(CF_3SO_2)_3C^-$, $CH_3COO^-$ and $CF_3COO^-$ and a cation selected from the group consisting of alkylphosphonium, alkylammonium, N-alkylpyridinium or N,N'-dialkylimidazolium.

15. The process of claim 14 wherein the vapor pressure of said reactive liquid having Lewis acidity is less than $10^{-4}$ Torr at 25° C.

16. The process of claim 14 wherein the reactive liquid for association with the gas having Lewis acidity is sufficient to provide for a working capacity within a pressure range from 20 to 760 Torr of at least 0.5 mole of gas per liter of liquid and provide for evolution from the reactive liquid of at least 50% at the operative temperature ranging from 0 to 150° C.

17. The process of claim 16 wherein the Lewis basic gas is boron trifluoride.

18. The process of claim 17 wherein the ionic liquid has a cation component which is N,N'-dialkylimidazolium and the anion component is $BF_4^-$.

19. In a process for effecting storage and of a gas, in a storage and delivery system comprised of, i) a vessel containing a medium capable of storing a gas and ii) a regulator for delivery of said gas stored in said medium from said vessel, the improvement for effecting storage by a method selected from the group consisting of:
   storing a gas having Lewis basicity in a reversibly reacted state within a reactive liquid having Lewis acidity wherein the Gibbs Free energy of reaction between the gas having Lewis basicity within a reactive liquid having Lewis acidity is from about −1 to −6 kcal/mol of reactive group over a temperature range of from 0 to 150° C; and,
   storing a gas having Lewis acidity in a reversibly reacted state within a reactive liquid having Lewis basicity and wherein the Gibbs Free energy of reaction between the gas having Lewis acidity within a reactive liquid having Lewis basicity is from about −1 to −6 kcal/mol of reactive group over a temperature range of from 0 to 150° C.

20. The process of claim 19 wherein the Gibbs free energy of reaction is from −2.5 to −3.5 kcal/mole between said gas and said reactive liquid at 25° C.

21. The process of claim 20 wherein the reactive liquid is an ionic liquid and the anion component of the reactive liquid is a cuprate, aluminate, or borate and the cation component is derived from N,N'-dialkylimidazolium salt.

22. In a process for effecting storage of a gas, in a storage and delivery system comprised of, i) a vessel containing a medium capable of storing a gas and ii) a regulator for delivery of said gas stored in said medium from said vessel, the improvement for effecting storage by a method selected from the group consisting of:

storing a gas having Lewis basicity in a reversibly reacted state within a reactive liquid having Lewis acidity wherein the Gibbs Free energy of reaction between the gas having Lewis basicity within a reactive liquid having Lewis acidity is from from −2.5 to −3.5 kcal/mole of reactive group at 25° C;

storing a gas having Lewis acidity in a reversibly reacted state within a reactive liquid having Lewis basicity and wherein the Gibbs Free energy of reaction between the gas having Lewis acidity within a reactive liquid having Lewis basicity is from about −2.5 to −3.5 kcal/mol of reactive group at 25° C; and, wherein the reactive liquid is an ionic liquid and the anion component of the reactive liquid is a cuprate, aluminate, or borate and the cation component is derived from an N,N'-dialkylimidazolium salt.

* * * * *

UNITED STATES PATENT AND TRADEMARK OFFICE
CERTIFICATE OF CORRECTION

| | | |
|---|---|---|
| PATENT NO. | : 7,172,646 B2 | Page 1 of 1 |
| APPLICATION NO. | : 10/413787 | |
| DATED | : February 6, 2007 | |
| INVENTOR(S) | : Daniel J. Tempel, Philip B. Henderson and Jeffrey R. Brzozowski | |

It is certified that error appears in the above-identified patent and that said Letters Patent is hereby corrected as shown below:

Column 13, Line 35

In claim 2 delete the word "150CC" and insert the word -- 150°C --

Column 14, Line 2

In claim 11 delete the word "alkyiphosphonium" and insert the word
-- alkylphosphonium --

Column 14, Line 52

In claim 19 delete the word "and"

Signed and Sealed this

Seventeenth Day of April, 2007

JON W. DUDAS
*Director of the United States Patent and Trademark Office*